United States Patent [19]

Koch

[11] Patent Number: 5,023,628

[45] Date of Patent: Jun. 11, 1991

[54] THERMAL HEAD MOUNTING/POSITIONING ASSEMBLY

[75] Inventor: Ulf Koch, Eberbach, Fed. Rep. of Germany

[73] Assignee: Esselte Meto International Produktions GmbH, Hirschhorn, Fed. Rep. of Germany

[21] Appl. No.: 495,974

[22] Filed: Mar. 20, 1990

[30] Foreign Application Priority Data

Mar. 21, 1989 [DE] Fed. Rep. of Germany ....... 3909254

[51] Int. Cl.[5] ............................................ G01D 15/10

[52] U.S. Cl. ............................... 346/76 PH; 346/145; 400/120

[58] Field of Search .......................... 346/76 PH, 145; 400/120

[56] References Cited

U.S. PATENT DOCUMENTS 4,750,880 6/1988 Stephenson et al. ........... 346/76 PH

FOREIGN PATENT DOCUMENTS 3616925 4/1987 Fed. Rep. of Germany .

0104347 6/1985 Japan ............................ 346/76 PH 0192671 10/1985 Japan ................................... 400/120

0173654 7/1988 Japan ............................. 346/76 PH

*Primary Examiner*—Benjamin R. Fuller

*Assistant Examiner*—Huan Tran

*Attorney, Agent, or Firm*—Sixbey, Friedman, Leedom & Ferguson

[57] ABSTRACT

A thermal printing head (10) having a housing (12, 14, 16) is described wherein a support (42) carrying a thermal printing plate (26) is mounted to be pivotable about an axis (28) mounted on both of its ends. The thermal printing plate (26) comprises several selectively triggerable heating elements being arranged in a line (36). In the housing (12, 14, 16), a counter-pressure roll (22) is mounted to be rotatable about an axis (20) with respect to which the line (36) heating elements of the thermal printing plate (26) is held in frictional contact along a paraxial generating line. The mounting axis (28) of the support (42) extends to be parallel with respect to the axis of the counter-pressure roll (20) and to be spaced apart from this axis (20). One end of the axis (28) of the support (42) is mounted in the housing (12, 14, 16) to be adjustable in perpendicular direction with respect to the plane formed by the axis (28) and the line (36) of the heating elements.

3 Claims, 2 Drawing Sheets

THERMAL HEAD MOUNTING/POSITIONING ASSEMBLY

Figure 1:
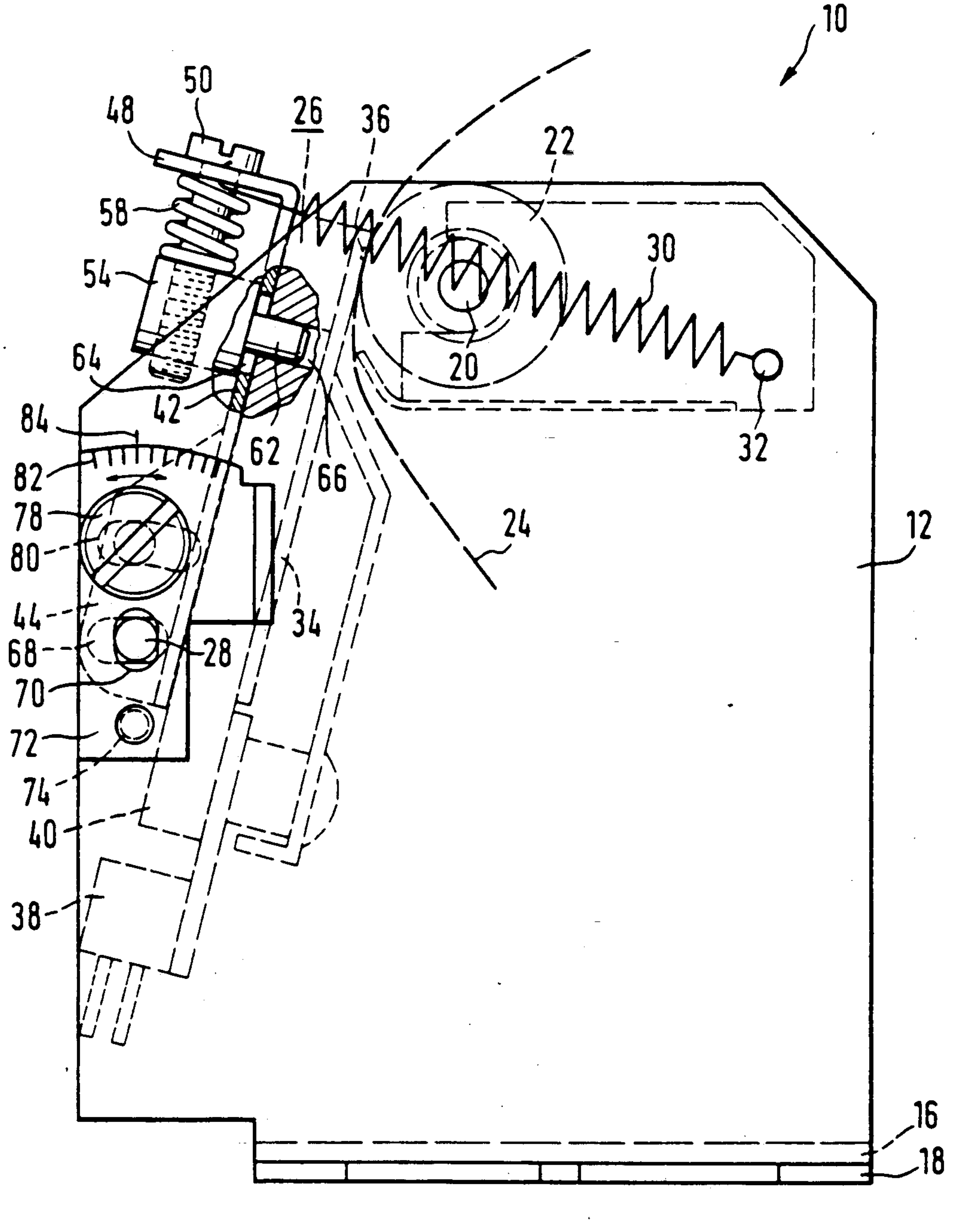

The invention relates to a thermal printing head having a housing wherein a support carrying a thermal printing plate is mounted to be pivotable about an axis mounted on its two ends, the thermal printing plate comprising several selectively triggerable heating elements being arranged in a line one adjacent to the other, a counter-pressure roll being mounted in said housing to be rotatable about an axis, the line of heating elements of the thermal printing plate being held in frictional contact therewith along a paraxial generating line, the support mounting axis extending to be parallel with respect to the axis of the counter-pressure roll and to be spaced apart from said axis.

Such a thermal printing head is known from DE-OS 36 16 925. During printing with this known thermal printing head, heat-sensitive paper is fed between the counter pressure roll and the thermal printing plate, with the paper contact being achieved precisely on the line of heating elements of the thermal printing plate. In synchronism with the feeding motion of the paper, electric triggering signals are applied to the heating elements in dependence on the data to be printed, said signals heating the heating elements and thereby causing the desired colour of the heat-sensitive paper to change as desired. In order to obtain a flawless printing image in such a thermal printing head, it has to be made sure that the contact line between the thermal printing plate and the counter-pressure roll coincides exactly with the line of heating elements and that the thermal printing plate is pressed against the counter-pressure roll with the same force along the whole line of heating elements. For attaining this uniform contact pressure, the axis of the counter-pressure roll, if a precise and uniform radius of the latter is presupposed, and the mounting axis of the thermal printing plate support have to extend very precisely to be parallel with respect to each other. Even slight deviations from parallelism result in non-uniform colour alteration of the heat-sensitive paper on the opposite ends of the line of heating elements. This preciseness of the parallel mounts of counter-pressure roll and mounting axis may only be obtained by expenditure of very narrow manufacturing tolerances.

It is the object underlying the invention to create a thermal printing head of the kind specified above by means of which a uniform printing image may be attained without especially high requirements having to be set for the manufacturing tolerances of the components used for mounting the thermal printing plate in the housing.

This object is met in accordance with the invention in that one end of the support axis is mounted to be adjustable in perpendicular direction with respect to the plane formed by the axis and the line of heating elements.

In the thermal printing head according to the invention, the mounting axis of the thermal printing plate is held, on one end in a mounting aperture which may be adjusted in a direction where an immediate effect on the parallelism of the axis of the counter-pressure roll and the mounting axis results. Due to this possibility to exert influence, a uniform printing image may be set by simply calibrating the mount being situated on one end of the mounting axis. Therefore the mounting axis and the corresponding mounting apertures may be manufactured without observing narrow manufacturing tolerances.

Advantageous further developments of the invention are characterized in the subclaims.

By way of example, the invention will be explained using the following drawing. Therein FIG. 1 is a schematic side view of the thermal printing head in accordance with the invention and FIG. 2 is a view of the thermal printing head of FIG. 1 taken from the left side, with the mounting region of the mounting axis being represented in sectional view on the right end of the axis.

Figure 2:
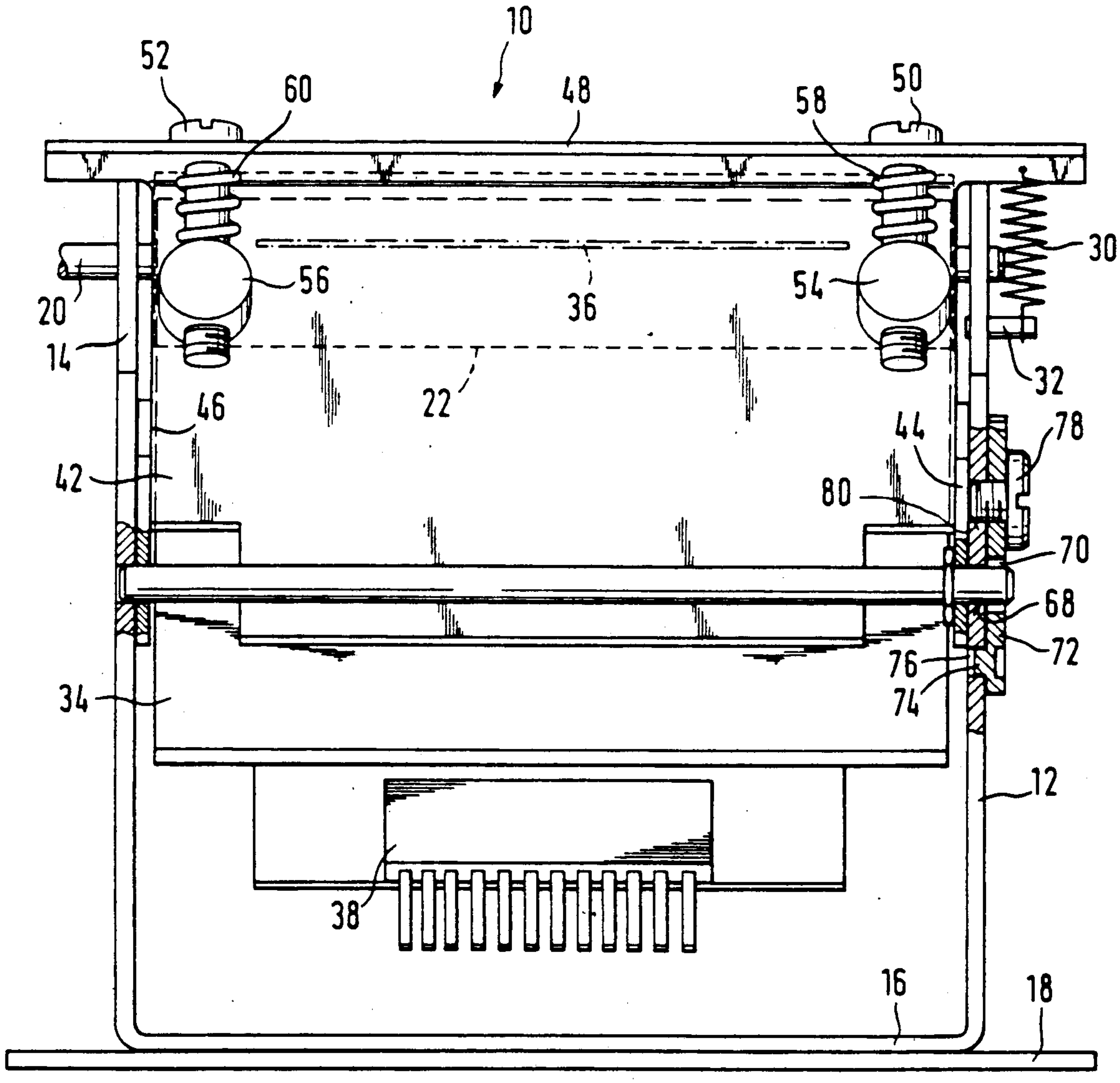

Thermal printing head 10 represented in FIG. 1 and 2 comprises a housing containing two side plates 12 and 14. Side plates 12, 14 are connected to each other by a front plate 16. A fitting plate 18 is attached to the front plate by means of which the thermal printing head may be attached to a non-represented printing device. An axis 20 having its ends mounted in side plates 12, 14 carries a counter-pressure roll 22 which may be driven by a non-represented motor so as to turn clockwise in the representation of FIG. 1 when a piece of heat-sensitive paper is to be transported along path 24 shown in broken lines.

A thermal printing plate 26 is pivotably mounted by means of an axis 28 extending between the two side plates 12 and 14. The thermal printing plate is held in frictional contact with counter-pressure roll 22 by means of spring 30 being fixed on thermal printing plate 26 on the one hand and on a pin 32 being fixedly situated in side plate 12.

Thermal printing plate 26 comprises several heating elements being arranged on a ceramic substrate 34, along a line 36 to be seen in FIG. 2. Non-represented integrated circuits are attached on ceramic substrate 34, serving for triggering the heating elements. Printed connection lines on the ceramic substrate lead to a connection plug 38 for connection of a (non-represented) bush seated on the end of a cable. The data signals resulting in the desired information being printed on the heat-sensitive paper being transported along path 24 are supplied to thermal printing plate 34 via this cable.

Ceramic substrate 34 is attached to a heat sink 40 serving for dissipating excess heat. A support 42 is seated on the side of heat sink 40 facing away from ceramic substrate 34, said support comprising, adjacent to side plates 12 and 14, brackets 44 or 46 respectively extending in parallel with respect to the side plates. Mounting apertures are provided in these brackets 44, 46 through which mounting axis 28 of thermal printing plate 26 extends. FIG. 2 shows that the apertures in brackets 44, 46 extend axially in a line with the associated apertures in side plates 12, 14 so that mounting axis 28 respectively extends through one aperture in one bracket 44, 46 and through a respectively associated aperture in side plates 12, 14.

Due to thermal printing plate 26 being mounted on axis 28 as described, thermal printing plate 26 may be pivoted counter-clockwise by exerting on the upper end of thermal printing plate 26 a tensile force being directed to the left in FIG. 1 so as to render the region situated between line 36 of heating elements and counter-pressure roll 22 freely accessible. This free accessibility is desirable for cleaning thermal printing plate 26 and counter-pressure roll 22 in this region.

As results from FIG. 1, calibration screws 50, 52 are provided in a front-side flange 48 of support 42 and screwed into respectively associated setting blocks 54, 56. Between these setting blocks and flange 48, there are inserted the shafts of pressure springs 58, 60 surrounding associated calibration screw 50, 52. It can be recognized from FIG. 1 that setting block 54 is provided with a pin 62, engaging aperture 66 in heat sink 40 through elongate hole 64 in sheet 42. Setting block 56 is similarly formed and comprises a pin engaging aperture 66 heat sink 40 through an elongate hole in sheet 36. Heat sink 40 may be displaced together with ceramic substrate 34 fixed thereto, parallel with respect to support 42, by rotating calibration screws 50, 52. This may result in that line 36 of the heating elements exactly coincides with the contact line between thermal printing plate 26 and counter-pressure roll 22. This is the presupposition for attaining a flawless printing image.

However, it is not sufficient for attaining a flawless printing image to set line 36 of the heating elements on ceramic substrate 34 by rotating calibration screws 50, 52 so that it coincides with the contact line on the counter-pressure roll; rather, additional provisions have to be made for the contact pressure, at which thermal printing plate 26 is pressed against counter-pressure roll 22, to be even along the whole contact line. This is achieved by using a special mount for the end of axis 28 being situated to the right in FIG. 2.

It may be seen from the drawing that the end of axis 28 being situated to the right in FIG. 2 is led through elongate hole 68 in side plate 12 outwardly into mounting aperture 70 of a plate-shaped setting member 72. It may be gathered from FIG. 1 that mounting aperture 70 is equally formed to be an elongate hole, which nevertheless extends, with respect to its longitudinal extension, perpendicularly to the longitudinal extension of elongate hole 68. Setting member 72 is provided, on the end situtated below in FIG. 1, with an integrally formed pin-like projection 74 engaging aperture 76 in side plate 12. Setting member 72 may be pivoted by rotation about projection 74, parallel with respect to side plate 12. Locking screw 78 is provided for fixing the position of setting member 72, said screw being screwed into a corresponding threaded bore in side plate 12. The shaft of locking screw 78 leads into side plate 12 through elongate hole 80; this elongate hole extends along a circular arc about the centre of projection 74. A scale 82 is provided on the upper end of setting member 72, the scale having associated therewith a corresponding marking 84 on side plate 12.

When locking screw 78 is released, setting member 72 may may be pivoted with projection 74 as the fulcrum. In the movement, axis 28 is shifted, the direction of shifting extending approximately perpendicularly with respect to the plane formed by line 36 of the heating elements and axis 28. The parallelism of line 36 of the heating elements and the axis of counter-pressure roll 22 may be influenced by the adjustment of axis 28. This parallelism must be provided for in order to attain, by means of spring 30, a uniform contact pressure between the heating elements and the counter-pressure roll over the whole length of line 36. A printing image being uniform over the whole width of the paper to be printed may only be produced at uniform contact pressure. The setting of parallelism by adjustment of setting member 72 may be checked during the execution of a printing process by observing whether heating elements cause the same blackening on the heat-sensitive paper on both ends of line 36. If there is a similar degree of blackening, arresting screw 80 is tightened for arresting setting member 72 in the position attained.

It is only necessary to use elongate hole 70 for receiving axis 28 in setting member 72 if elongate hole 68 in side plate 12 extends rectilinearly, but not along an arc about pin 74. Namely, if elongate hole 68 is formed to be rectilinear, a radial displacement of axis 28 must be admitted during adjustment of setting member 72, which is facilitated by means of elongate hole 70. The rectilinear design of elongate hole 68 in the embodiment described has been selected for reasons of simplified production. In addition, the rectilinear design of elongate hole 68 results in that, during setting of the contact pressure of the heating elements by means of setting member 72, line 36 of these elements continues to coincide with the contact line between thermal printing plate 26 and counter-pressure roll 22. Forming elongate hole 68 to be non-rectilinear would cause line 36 to be twisted with respect to axis 20 of counter-pressure roll 22, which would require re-calibration of thermal printing plate 26 by means of calibration screws 50 and 52.

However, it is also possible to mount axis 28 in a round hole in setting member 72; in this case, a rounded aperture would be provided in side plate 12 instead of elongate hole 68, its diameter being selected so that there is no contact between mounting axis 28 and side plate 12 when setting member 72 is pivoted about projection 74. Thus, an easy possibility of calibrating parallelism of line 36 of the heating elements and the axis of counter-pressure roll 22 by means of the described configuration of the termal printing head so that uniform pressure may be attained over the whole paper width even if the width of the paper to be printed is large.

I claim:

1. A thermal printing head having a housing wherein a support carrying a thermal printing plate is mounted to be pivotable about an axis mounted on both of its ends, the thermal printing plate comprising several seletively triggerable heating elements being arranged in a line, one adjacent to the other, a counter-pressure roll being mounted in said housing to be rotatable about an axis, the line of heating elements of the thermal printing plate being held in frictional contact therewith along a paraxial generating line, the mounting axis of the support extending to be parallel with respect to the axis of said counter-pressure roll and to be spaced apart from said axis, characterized in that one end of the axis (28) to be adjustable in perpendicular direction with respect to the plane formed by said axis (28) and the line (36) of the heating elements where the adjustably mounted end of the axis (28) is mounted in one aperture (70) of a setting member (72) being pivotably connected with a side plate (12) of the housing (12, 14, 16).

2. A thermal printing head according to claim 1, characterized in that an elongate hole (80) is provided in the setting member (72) to describe a portion of a circular arc about a projection (74) connecting the setting member (72) to the side plate (12) of the housing (12, 14, 16), and that an locking screw (78) for fixing the position of the setting member (72) is screwed into the side plate (12) through elongate hole (80).

3. A thermal printing head according to claims 1 or 2, characterized in that a scale (82) is provided on the setting member (72), and that a marking (84) for indicating the position of the setting member (82) is provided on the side plate in allocation to said scale (82).

* * * * *